US005236785A

United States Patent [19]

Kaburaki et al.

[11] Patent Number: 5,236,785

[45] Date of Patent: Aug. 17, 1993

[54] PRINTING SHEET

[75] Inventors: Yoshiaki Kaburaki; Koichi Tomita; Keno Kamimura, all of Shizuoka, Japan

[73] Assignee: Tomoegawa Paper Co., Ltd., Tokyo, Japan

[21] Appl. No.: 845,525

[22] Filed: Mar. 4, 1992

Related U.S. Application Data

[63] Continuation of Ser. No. 575,189, Aug. 30, 1990, abandoned.

[30] Foreign Application Priority Data

Sep. 1, 1989 [JP] Japan ................................ 1-224360

[51] Int. Cl.[5] ............................................ B32B 27/30

[52] U.S. Cl. .................................. 428/522; 428/483; 428/510; 428/514

[58] Field of Search ............... 428/480, 483, 507, 511, 428/510, 514, 463, 522; 526/312, 317.1; 525/293, 301

[56] References Cited

U.S. PATENT DOCUMENTS

| | | | |
|---|---|---|---|
| 4,391,767 | 7/1983 | Pears | 264/210.3 |
| 4,397,984 | 8/1983 | Wendel et al. | 524/814 |
| 4,571,363 | 2/1986 | Culbertson et al. | 428/332 |
| 4,700,208 | 10/1987 | Vanier et al. | 503/227 |
| 4,865,914 | 9/1989 | Malhotra | 428/331 |
| 4,980,238 | 12/1990 | Ohmae et al. | 428/514 |

*Primary Examiner*—Paul J. Thibodeau
*Assistant Examiner*—D. S. Nakarani
*Attorney, Agent, or Firm*—Scully, Scott, Murphy & Presser

[57] ABSTRACT

A printing sheet consisting of a supporting body and a surface layer which covers at least one side of the supporting body and includes copolymers consisting of acrylic monomers having carboxyl groups and acrylic monomers having amino groups or amide groups. In another aspect of the present invention, there is provided a printing sheet consisting of a supporting body and a surface layer which covers at least one side of the supporting body and includes copolymers or homopolymers, which consist of acrylic monomers having amino groups or amide groups, and copolymers or homopolymers which consist of acrylic monomers having carboxyl groups.

2 Claims, No Drawings

PRINTING SHEET

This is a continuation of copending application Ser. No. 575,189 filed on Aug. 30, 1990, now abandoned.

BACKGROUND OF THE INVENTION

1. Field of the Invention

The present invention relates to an improved printing sheet having good ink adhesive properties, sheet running properties, anti-blocking properties, etc., and more particularly relates to an improved printing sheet having good adhesive properties when used with ultraviolet-curable ink (hereinafter, "ultraviolet-curable ink" is referred to as "UV ink").

2. Prior Art

In recent years, a diversification of printed products requires printing on a wider variety of materials in sheets, for example, papers, synthetic papers, thermoplastic resin films, metallic foils, metallized sheets, etc. These printed items are printed by methods such as by offset printing, gravure, flexography, screen process printing and letterpress printing. In these printing methods, a method which uses UV ink has recently become popular because UV inks cure rapidly, and the printing method which uses UV ink is of superior handling. At present, there is a great demand for flat, sheet-like items.

In printing methods which use UV ink, the printing sheet requires, in particular, the property of adhering well to cured UV ink. Additionally, general required properties such as sheet running properties, anti-blocking properties, producing uniform spread of the ink over the surface of the sheet, as well as antistatic properties.

However, the above materials formed in sheets, especially films of thermoplastic resin, will not sufficiently adhere with UV ink after printing and curing. Accordingly the printed and cured UV ink has a problem in that the printed and cured UV ink separates from the materials formed in a sheet.

Therefore, a printing sheet which has superior adhesion with the UV ink is required.

SUMMARY OF THE INVENTION

This invention has the above-described problems in mind, and an object of this invention is therefore to provide a printing sheet, particularly a thermoplastic film printing sheet, which has superior properties required of printing sheets, and particularly has superior adhesive properties with cured UV ink.

According to the invention, there is provided a printing sheet comprising a supporting body and a surface layer which covers at least one side of the supporting body and comprises a copolymer consisting of an acrylic monomer having a carboxyl group and an acrylic monomer having an amino group or an amide group.

In another aspect, the present invention provides a printing sheet comprising a supporting body and a surface layer which covers at least one side of the supporting body and comprises a copolymer or a homopolymer, which consists of an acrylic monomer having an amino group or an amide group, and a copolymer or a homopolymer which consists of acrylic monomer having a carboxyl group.

DESCRIPTION OF PREFERRED EMBODIMENTS OF THE INVENTION

In this invention, the expression "acrylic monomer having an amino group or an amide group" denotes, for example, (meth)acrylic amide and all types of (meth)acrylic esters containing amino groups such as a primary amino group(—$NH_2$), a secondary amino group(—NH—), a tertiary amino group(>N—), etc., particularly, 2-aminoethyl (meth)acrylate, 2-(methylamino) ethyl (meth)acrylate, 2-(dimethylamino) ethyl (meth)acrylate, 2-(diethylamino) ethyl (meth)acrylate, 3-(dimethylamino) propyl (meth)acrylate, 4-(dimethylamino)-n-butyl (meth)acrylate, acrylamide, N-methylolacrylamide, N-ethylolacrylamide, diacetone acrylamide, etc., are given, but are not limited to these. The expression "an acrylic monomer having a carboxyl group" denotes chemicals such as acrylic acid, methacrylic acid, maleic acid, itaconic acid, etc., but are not limited to these. In these monomers, as the "acrylic monomer having an amino group or an amide group", 2-(dimethylamino) ethyl (meth)acrylate, 2-(diethylamino) ethyl (meth)acrylate and N-alkylolacrylamide are preferable, and as the "acrylic monomer having a carboxyl group", acrylic acid and methacrylic acid are preferable.

In this invention, the expression "a surface layer" denotes a layer which covers at least one side of the supporting body described bellow. This surface layer contains the above copolymer or homopolymer which has the above acrylic monomer, and a composition which is described bellow. The copolymer which has the above acrylic monomer having a carboxyl group, and the above acrylic monomer having an amino group or an amide group, denotes copolymers which consist of the above two ingredients, or copolymers which consist of not fewer than one kind of monomer which can polymerize with the above copolymers in addition to the above two ingredients. In this case, "a monomer which can polymerize" denotes, for example, a (meth)acrylic monomer, styrene monomer, etc., particularly, n-butyl (meth)acrylate is preferable.

The ratio of composition of the above acrylic monomer in the surface layer is the ratio "acrylic monomer having amino group or amide group"/"acrylic monomer having carboxyl group", which is between 8/2 to 2/8, inclusive (mole ratio), and is preferably between 6/4 to 4/6, inclusive. The ratio of the weights of the above acrylic monomers, in the surface layer, is over 1%, preferably between 5 to 40%. As the thickness of the surface layer, 1 to 10 μm is preferable.

In this invention, the surface layer is formed on the supporting body by applying a paint which is prepared in which the above compound is dissolved or dispersed in a solvent, water, etc., with a binding resin, if necessary. This paint is applied by the method of roll coating, blade coating, spray coating, air knife coating, rod bar coating, etc., on the supporting body and then dried. As the other method of forming the surface layer, a compound of the above material for forming the surface layer is mixed uniformly, and is used to form the surface layer on the supporting body by the method of hotmelt coating or laminating. In this case, as the binding resin, the resin which is generally used for coating and laminating is used. All types of copolymers or homopolymers may be used, for example, polyester resin, acrylic resin, methacrylic resin, vinyl chloride resin, vinyl acetate resin, etc.

The surface layer can contain all other additional agents, if necessary, for preventing the blocking of one sheet to another, and for improving the sheet running property, antistatic property, nontranceparency property, etc. As the above addition agent, for example, a pigment such as polyethylene oxide, silica, clay, talc, diatomaceous earth, calcium carbonate, calcium sulfate, barium sulfate, aluminum silicate, synthetic zeolite, alumina, zinc oxide, titanium oxide, lithopone, satin white, etc., and cationic, anionic and nonionic antistatic agents, etc., may be used.

As the supporting body which can be used in this invention, a thermoplastic resin sheet, paper, synthetic paper, woven fabric, nonwoven fabric, ceramic sheet, metallic fiber sheet, metalized sheet (film), metallic foil, metallic plate, etc., and a composite sheet, which is formed by combination of the above materials formed into a multilayer structure, are preferred. If a printing machine can be adapted, the form of the supporting body is not limited to, for example, a film, sheet, plate, etc.

In this invention, the printing sheet which has particularly superior adhesive property with cured UV ink, comprises a surface layer which has the copolymer polymerized n-butyl methacrylate and the "acrylic monomer having an amino group or an amide group" which at least one type is selected from the group consisting of 2-(dimethylamino) ethyl methacrylate, 2-(diethylamino) ethyl methacrylate and N-alkylolacrylamide, and the "acrylic monomer having a carboxyl group" which is selected from acrylic acid and methacrylic acid. This surface layer covers the supporting body.

In this printing sheet, a reverse face of the supporting body, namely a face not covered by the surface layer, can be covered with a pressure-sensitive adhesive layer which consists of a commonly used pressure-sensitive adhesive agent. Furthermore, if it is necessary, a releasing film or sheet consisting of a releasing agent, can cover the pressure-sensitive adhesive layer. This printing sheet can be used for an adhesive label which may be affixed to a number of types of surface. Accordingly, this printing sheet can expand the uses of the printing sheet of this invention.

EXAMPLES

The following examples further illustrate preferred operations within the scope of the present invention. "Parts", within the meaning of the present invention, means parts by weight.

EXAMPLE 1

A film made of polyethylene terephthalate and having a thickness of 100 μm (marketed by the Fuji Film company under the name of PET100G) was used, and on one face of this film, a surface layer was formed by applying a paint which contained the components listed below, and the surface layer was dried. This surface layer had a thickness of 3 μm.

The following are components of the above paint:
10 parts of 2-(dimethylamino) ethyl methacrylate/acrylic acid/methyl methacrylate/n-butyl methacrylate (2:2:2:4) copolymer;
molecular weight is in the region of 100,000; non-volatile matter is 40%
8 parts of toluene
2 parts of methyl ethyl ketone.

EXAMPLE 2

The same procedure as described for Example 1 was repeated except the components of the paint were as given below.

The following are the components of the above paint:
10 parts of 2-(dimethylamino) ethyl methacrylate/acrylic acid/methyl methacrylate/n-butyl methacrylate (1:1:2:6) copolymer;
molecular weight is in the region of 100,000; non-volatile matter is 40%
8 parts of toluene
2 parts of methyl ethyl ketone.

EXAMPLE 3

The same procedure as described for Example 1 was repeated except the components of the paint were as given below.

The following are the components of the above paint:
10 parts of 2-(diethylamino) ethyl methacrylate/methacrylic acid/methyl methacrylate/n-butyl methacrylate (0.5:0.5:3:6) copolymer;
molecular weight is in the region of 100,000; non-volatile matter is 40%
8 parts of toluene
2 parts of methyl ethyl ketone.

EXAMPLE 4

The same procedure as described for Example 1 was repeated except the components of the paint were as given below.

The following are the components of the above paint:
5 parts of 2-(diethylamino) ethyl methacrylate/n-butyl methacrylate (2:8) copolymer;
molecular weight is in the region of 50,000; non-volatile matter is 40%
5 parts of acrylic acid/n-butyl methacrylate (2:8) copolymer;
molecular weight is in the region of 50,000; non-volatile matter is 40%
8 parts of toluene
2 parts of methyl ethyl ketone.

EXAMPLE 5

The same procedure as described for Example 1 was repeated except the components of the paint were as given below.

The following are the components of the above paint:
10 parts of acrylamide/acrylic acid/methyl methacrylate/n-butyl methacrylate (1:1:2:6) copolymer;
molecular weight is in the region of 100,000; non-volatile matter is 40%
8 parts of toluene
2 parts of methyl ethyl ketone.

EXAMPLE 6

The same procedure as described for Example 1 was repeated except the components of the paint were as given below.

The following are the components of the above paint:
10 parts of N-methylolacrylamide/acrylic acid/methyl methacrylate/n-butyl methacrylate (1:1:2:6) copolymer;
molecular weight is in the region of 100,000; non-volatile matter is 40%
8 parts of toluene
2 parts of methyl ethyl ketone.

COMPARATIVE EXAMPLE 1

The same procedure as described for Example 1 was repeated except the components of the paint were as given below.

The following are the components of the above paint:

20 parts of methyl methacrylate resin (marketed by the Soken Kagaku company under the name of M-2000); non-volatile matter is 10%

5 parts of toluene 5 parts of methyl ethyl ketone.

COMPARATIVE EXAMPLE 2

The same procedure as described for Example 1 was repeated except the components of the paint were as given below.

The following are the components of the above paint:

10 parts of 2-(diethylamino) ethyl methacrylate/n-butyl methacrylate (2:8) copolymer;

molecular weight is in the region of 50,000; non-volatile matter is 40%

8 parts of toluene 2 parts of methyl ethyl ketone.

COMPARATIVE EXAMPLE 3

The same procedure as described for Example 1 was repeated except the components of the paint were as given below.

The following are the component of the above paint:

10 parts of acrylic acid/n-butyl methacrylate (2:8) copolymer;

molecular weight is in the region of 50,000; non-volatile matter is 40%

8 parts of toluene 2 parts of methyl ethyl ketone.

The printing sheets obtained by the above procedure (Examples 1 to 6, and Comparative Examples 1 to 3) were evaluated in regard to the adhesive properties of the ink, and reproducebility. In the method of evaluation, UV ink (marketed by the Toyo Ink Mfg. Co., Ltd. under the name of FLASH DRY, dark blue) was printed on these sheets, then cured by three UV lamps (5.6 kw) at a distance of 14 cm between the lamps and the sheets, for 3 seconds. These printing sheets was evaluated by the I.G.T. printability tester (produced by Kumagaya Riki Co., Ltd.).

The results obtained are shown in Table 1 below.

TABLE 1

| | Reproducebility | Adhesion |
|---|---|---|
| Example 1 | ○ | ◎ |
| Example 2 | ○ | ◎ |
| Example 3 | ○ | ◎ |
| Example 4 | ○ | ◎ |
| Example 5 | ○ | ○ |
| Example 6 | ○ | ◎ |
| Comparative 1 | ○ | X |
| Comparative 2 | ○ | X |
| Comparative 3 | ○ | X |

In Table 1, "Reproducebility" indicates producing uniform spread of the ink over the surface of the sheets, and "Adhesion" indicates how well the ink adhered to the sheets. In the Table 1, the "Reproducebility" was evaluated by visual inspection; and ○ indicates desirable thickness, and × indicates an unsatisfactory thickness.

In Table 1, adhesive properties were evaluated by use of adhesive tape. This adhesive tape was applied on the above printing sheet having dried UV ink on its surface, and then the adhesive tape was quickly removed. In this way, the properties of the ink which is printed on the printing sheet are observed. ◎ indicates that the ink did not come off the printing sheet; ○ indicates that some of the ink came off the printing sheet; Δ indicates that the ink came off the printing sheet to a considerable extent but that printed letters, etc., were still legible; × indicates that the ink came off the printing sheet to a considerable extent, and accordingly, the remnants of printed letters, etc., could not be read.

Next, the printing sheets obtained by the above procedures (Examples 1 to 6) were subjected to actual printing conditions. In this practical test, an offset printing machine (HEIDERBERG MO) was used, and 10,000 sheets of the above printing sheet were printed. The result was that above printing sheets produced highly desirable properties with respect to adhesion of the ink to the above sheets, reproducebility, etc.

What is claimed is:

1. A printing sheet comprising a supporting body and a surface layer, said surface layer covering at least one side of said supporting body and comprising a copolymer consisting of two acrylic monomers, the first monomer (a) having carboxyl groups and the second monomer (b) being selected from the group consisting of 2-(dimethylamino) ethyl (meth)acrylate and 2-(diethylamino) ethyl (meth)acrylate, wherein the molar ratio of said monomer (a) to said monomer (b) is in the range of between 2:8 and 8:2.

2. A printing sheet comprising a supporting body and a surface layer, said surface layer covering at least one side of said supporting body and comprising two polymers, the first of said polymers being selected from the group consisting of a copolymer and a homopolymer, said first polymer further comprising an acrylic monomer (c), selected from the group consisting of 2-(dimethylamino) ethyl (meth)acrylate and 2-(diethylamino) ethyl (meth)acrylate, and the second of said polymers being selected from the group consisting of a copolymer and a homopolymer, said second polymer further comprising an acrylic monomer (d) having carboxyl groups, wherein the molar ratio of said monomer (c) to said monomer (d) in the surface layer being in the range of between 2:8 and 8:2.

* * * * *